United States Patent [19]
Tyren

[11] Patent Number: 5,990,792
[45] Date of Patent: *Nov. 23, 1999

[54] LABEL INCLUDING AMORPHOUS TAPE WITH IMPROVED PROPERTIES

[75] Inventor: Carl Tyren, Antibes, France

[73] Assignee: RSO Corporation N.V., Curacao, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/737,099

[22] PCT Filed: Apr. 25, 1995

[86] PCT No.: PCT/SE95/00450

§ 371 Date: Dec. 16, 1996

§ 102(e) Date: Dec. 16, 1996

[87] PCT Pub. No.: WO95/29534

PCT Pub. Date: Nov. 2, 1995

[30] Foreign Application Priority Data

Apr. 26, 1994 [SE] Sweden .................. 9401436

[51] Int. Cl.⁶ .................................................. G08B 13/187
[52] U.S. Cl. .................... 340/572.6; 340/551; 340/572.1
[58] Field of Search .................................. 340/551, 572, 340/572.1, 572.6

[56] References Cited

U.S. PATENT DOCUMENTS

| | | | |
|---|---|---|---|
| 4,492,922 | 1/1985 | Ohkubo | 324/207.21 |
| 4,647,917 | 3/1987 | Anderson, III et al. | 340/572.4 |
| 4,704,602 | 11/1987 | Åsbrink | 340/551 |
| 4,710,752 | 12/1987 | Cordery | 340/551 |
| 5,005,001 | 4/1991 | Cordery | 340/551 |
| 5,049,857 | 9/1991 | Plousky et al. | 340/551 |
| 5,160,888 | 11/1992 | Laukien | 324/309 |
| 5,300,922 | 4/1994 | Stoffer | 340/551 |
| 5,397,986 | 3/1995 | Conway et al. | 340/551 |
| 5,420,569 | 5/1995 | Dames et al. | 340/551 |
| 5,551,158 | 9/1996 | Tyren et al. | 340/551 |
| 5,576,693 | 11/1996 | Tyren et al. | 340/551 |
| 5,621,316 | 4/1997 | Dames et al. | 324/207.13 |
| 5,739,752 | 4/1998 | Tyren | 340/551 |
| 5,760,580 | 6/1998 | Tyren | 340/551 |

FOREIGN PATENT DOCUMENTS

| | | |
|---|---|---|
| 96182 | 12/1983 | European Pat. Off. . |
| 2167627 | 5/1986 | United Kingdom . |
| WO 88/1427 | 2/1988 | WIPO . |
| 9304538 | 3/1993 | WIPO . |
| 9314478 | 7/1993 | WIPO . |
| WO 93/14370 | 7/1993 | WIPO . |
| WO 95/29467 | 11/1995 | WIPO . |

*Primary Examiner*—Glen Swann
*Attorney, Agent, or Firm*—Merchant & Gould P.C.

[57] ABSTRACT

A label for marking and remote identification of objects, is formed of at least one elongated tape (10) of a magneto-elastical material with a high magneto-mechanical coupling, the tape (10) being movably arranged within a cavity in the label. At least one element (11) is applied on the tape (10) for changing the mass of the tape (10), while preserving the magnetic properties of the tape. The cavity contains a liquid of low viscosity, such as silicon oil, which surrounds the tape.

8 Claims, 2 Drawing Sheets

LABEL INCLUDING AMORPHOUS TAPE WITH IMPROVED PROPERTIES

FIELD OF THE INVENTION

The present invention relates to amorphous tapes with improved properties for use in labels. The labels are used for the purpose of marking and identifying objects.

DESCRIPTION OF THE PRIOR ART

The type of labels mentioned above is described in, e.g., WO 88/01427 and EP-B-0 096 182. The labels in these patent specifications are provided with an internal cavity, in which at least one tape of an amorphous material resides. The tape material has a large magneto-mechanical coupling, i.e., a mechanical load on the tape also causes a change in the magnetic properties of the tape. The tape or strip is a kind of mechanically resonating element, the resonance frequency of which being located in different frequency bands depending on the length of the tape.

The magnetic properties of the tape are also influenced by its length and geometry. For instance, the demagnetizing effect present at the ends of a tape has a substantially different influence on the magnetization of the tape, depending on the length of the tape. This means that tapes with different lengths are magnetized to different degrees when exposed to an identical magnetic field.

With magneto-elastical resonance elements, such as amorphous tapes, the magneto-elastical coupling factor, which affects the signal strength of the tape, and the $\Delta$-E effect, which affects the resonance frequency of the tape, both depend on the magnetization of the tape. In the embodiment disclosed in EP-B-0 096 182, the above-mentioned factors have substantially no importance. In the embodiment according to WO 88/01427, on the other hand, certain problems are associated with adjusting a magnetic control field in the form of a bias field, if tapes with different lengths are used together in labels, which are read simultaneously. This is particularly true, if simultaneous signals are desired from many tapes at the same time, and if all tapes simultaneously are supposed to produce a high coupling factor and a strong frequency response. If, for instance, such a control field is used, that optimally magnetizes tapes with shorter lengths, longer tapes will already be over-magnetized beyond saturation. Thus, significant problems arise when it comes to detecting the tapes and keeping the signals within the desired part of the frequency band of the tapes. To some extent, the above-mentioned problem may be reduced by producing a control field in a considerably more complex and complicated way. However, the improvement does only occur to a minor degree, and a certain amount of time is lost at the label detection.

The label detection is done by exposing the tapes to a magnetic interference signal, whereby the tapes are forced into a state of mechanical oscillation. The tape resonance can be detected by the use of a magnetic detection coil. The tape resonance frequency is highly influenced by surrounding magnetic fields, and the above-mentioned bias field is used to vary the magnetic field in an interrogation zone, thereby making it possible to simultaneously detect identical tapes, which are exposed to magnetic fields of different strengths or different directions.

BRIEF SUMMARY OF THE INVENTION

An object with the present invention is to provide tapes, which are identically magnetized but which work within different frequency bands. This is accomplished by the use of tapes with identical geometries (length, width and thickness), which are exposed to an influence for changing the tape mass while preserving the magnetical properties of the tape. Functionally, these new resonance elements may be viewed upon as a spring, the spring constant of which being magnetically controllable through the $\Delta$-E effect, and which has a mass applied at each end. The resonance frequency then depends on the masses, the spring constant and the self-mass of the spring/tape.

BRIEF DESCRIPTION OF THE DRAWINGS

The invention will now be described in more detail by way of preferred embodiments and with reference to the accompanying drawings, in which.

DETAILED DESCRIPTION

Figure 1:
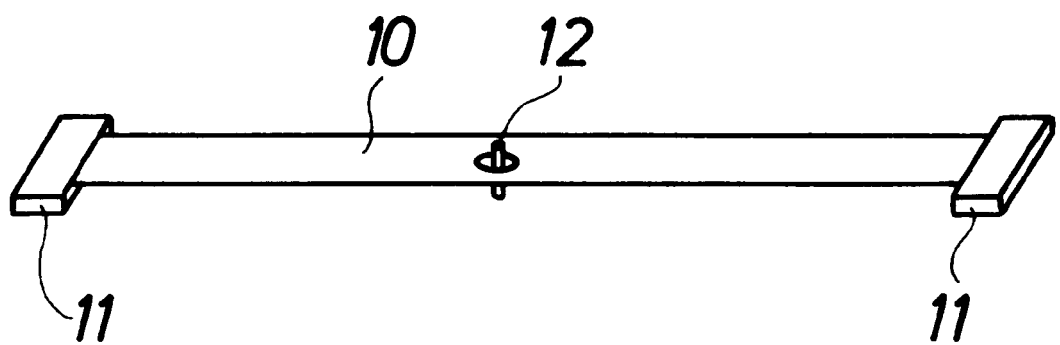
FIG. 1 is a schematic perspective view of a tape according to the invention.

FIG. 1 shows an elongated tape 10, which is made of an amorphous material. The material has a large magneto-mechanical coupling, which means that the magnetical behaviour of the material is strongly influenced by the mechanical conditions of the tape. This is true to the same extent also inversely. At each end of the tape 10, elements 11 are arranged so as to change the mass of the tape 10. Despite the presence of the elements 11, the magnetical properties of the tape will be substantially preserved, hence the elements are preferably formed of a non-magnetic material. Furthermore, to avoid eddy-current losses, the material is preferably not electrically conducting.

The element 11 may be mounted on the tape 10 by means of gluing, clamping, geometrical locking, etc. As an alternative, the masses may be arranged by means of electrochemical deposition. The latter method is suitable for industrial scale manufacture, wherein the additional mass will be properly fixed on the tape and will easily be given a streamline shape. By the use of this manufacturing method, it is also possible to excite the tape to oscillation during the deposition and to measure the tape resonance frequency. Thereby, the deposition may be interrupted, as soon as the tape has reached a desired resonance frequency.

As an alternative to applying an additional mass on the tape, a local modification of the geometry of the amorphous tape may realize a change of mass without any significant change in the magnetical properties of the tape.

In order to give the tapes the ability to vibrate freely, the cavity 13 in which they are mounted within the label must be larger than the extension length of the tape. To further increase the ability of the tape to oscillate without any significant limitation by mechanical contact with the cavity walls, the tape may be provided with a preferably centrally arranged opening. A pin 12 is arranged through the opening, thereby preventing the tape from being displaced too much in the cavity 13, in which case its vibrating abilities would be decreased. The tapes have proven to have particularly good properties, if the cavity 13 is filled with a thin liquid 14 of low viscosity, such as silicone oil. The liquid 14 improves the possibilities for a harmonical oscillation, without any substantial damping of these oscillations.

Figure 2:
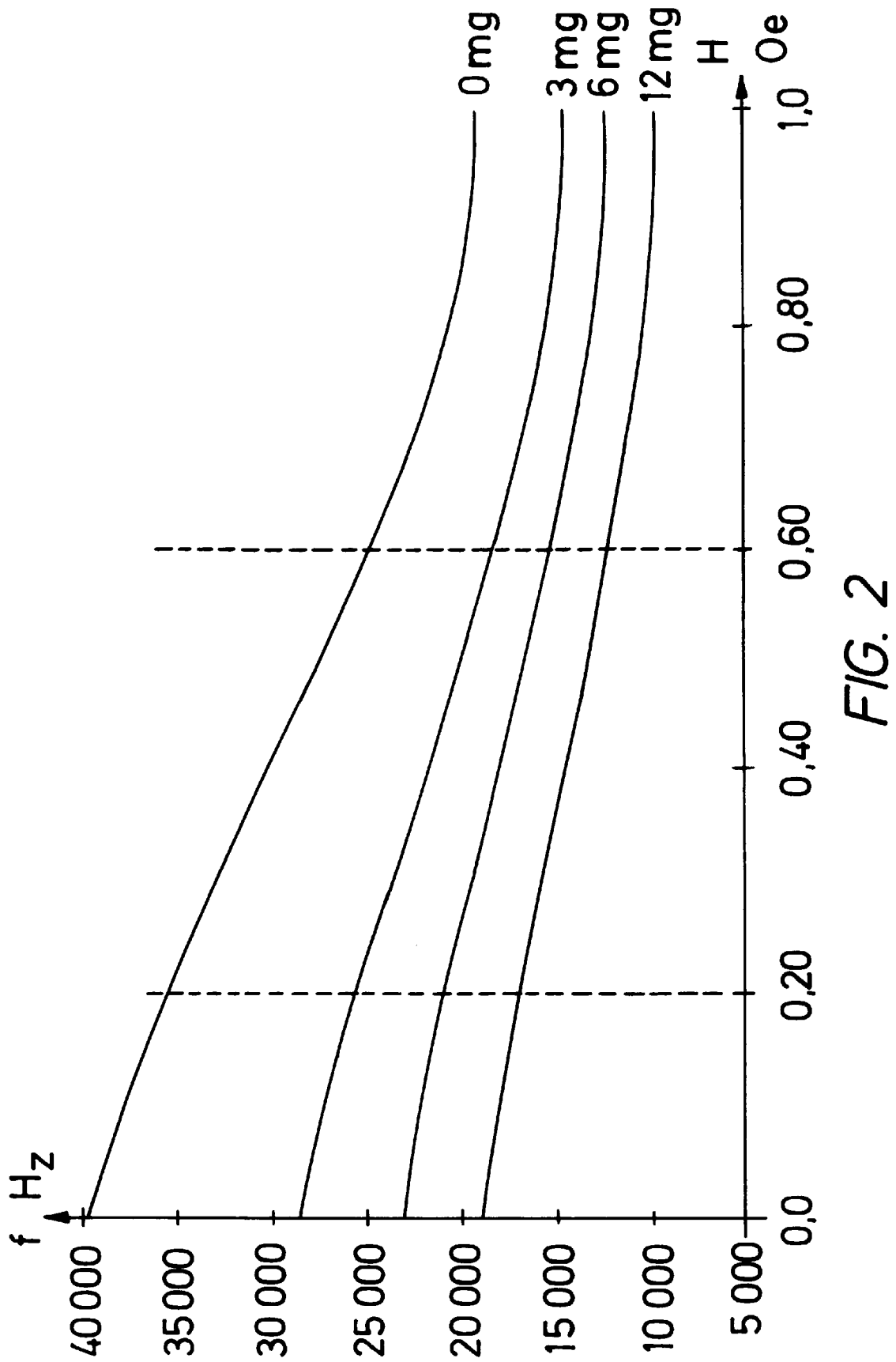
FIG. 2 is a graph showing the resonance frequency of different tapes as a function of a surrounding magnetic field.

FIG. 2 shows the tape resonance frequency as a function of an applied bias field or control field. The X-axis represents the magnetizing field intensity in Oersted, and the Y-axis represents the resonance frequency in Hz. The uppermost graph in the FIG. 2 diagram relates to a tape, on which no masses are applied. The next graph relates to a tape, both ends of which being provided with an element 11 weighing 3 mg. Below that graph, a graph representing a tape with an applied mass of 6 mg is shown, and the last graph refers to a tape with an applied mass of 12 mg at each end of the tape. The tape dimensions in this embodiment are: length=60 mm, width=2 mm, and thickness=0.025 mm.

According to FIG. 2, every graph has a relatively linear portion between the values 0.20 and 0.60 for the magnetizing field intensity H. Within the same portion the tape resonance frequency varies between approximately 15000 Hz and 35000 Hz, providing a good opportunity to identify many tapes in one detection process.

Furthermore, tapes with applied masses of different sizes exhibit frequency minimum at the same magnetic field, even if the actual frequency values deviate from each other. Correspondingly, the same is true for the coupling factor of the tapes, which reaches its maximum at approximately the same magnetizing field intensity H of the bias field.

I claim:

1. Label for marking and remote identification of objects, comprising at least one elongated tape of a magneto-elastical material with a high magneto-mechanical coupling, the tape having a pair of long sides and a pair of short sides, the tape being movably arranged within a cavity in the label, further comprising at least one element on the tape for changing a mass of the tape, while preserving magnetical properties of the tape, wherein the tape is surrounded in the cavity by a liquid of low viscosity.

2. Label according to claim 1, wherein the element is applied at one of the short sides of the tape.

3. Label according to claim 1, wherein the element is applied at each short side of the tape.

4. Label according to claim 1, wherein the element is made of a non-magnetic material.

5. Label according to claim 1, wherein the element is made of an electrically non-conducting material.

6. Label according to claim 1, wherein the element is glued to the tape.

7. Label according to claim 1, wherein the element is electrochemically deposited on the tape.

8. Label according to claim 1, wherein the element is clamped to the tape.

* * * * *

UNITED STATES PATENT AND TRADEMARK OFFICE
CERTIFICATE OF CORRECTION

PATENT NO. : 5,990,792
DATED : NOVEMBER 23, 1999
INVENTOR(S) : TYREN

It is certified that error appears in the above-identified patent and that said Letters Patent is hereby corrected as shown below:

Cover page, [73] Assignee: "Curacao, Netherlands" should read --Curacao AN, Netherlands--

Cover page, [30] Foreign Application Priority Data: "9401436" should read --9401436-2--

Cover page, [56] References Cited, U.S. Patent Documents: "Plousky" should read --Plonsky--

Signed and Sealed this

Twenty-second Day of May, 2001

Attest:

NICHOLAS P. GODICI

Attesting Officer

Acting Director of the United States Patent and Trademark Office